Figure 1:
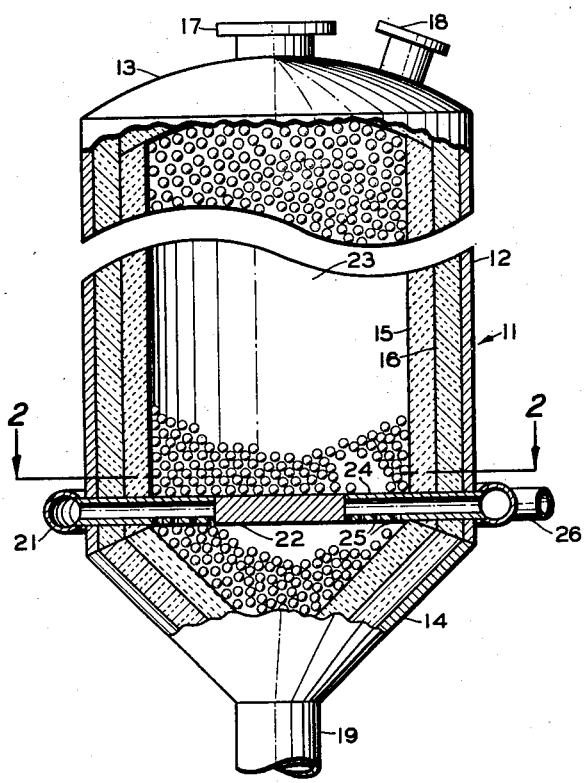

Aug. 8, 1950  R. R. GOINS ET AL  2,518,304
GAS DISTRIBUTOR FOR PEBBLE HEATERS
Filed Aug. 12, 1948  3 Sheets-Sheet 1

INVENTORS
D. S. HALL
R. R. GOINS
BY
*Hudson and Young*
ATTORNEYS

INVENTORS
D.S. HALL
R.R. GOINS
BY Hudson and Young
ATTORNEYS

UNITED STATES PATENT OFFICE 2,518,304

GAS DISTRIBUTOR FOR PEBBLE HEATERS

Robert R. Goins and Dick S. Hall, Bartlesville, Okla., assignors to Phillips Petroleum Company, a corporation of Delaware Application August 12, 1948, Serial No. 43,804

10 Claims. (Cl. 263—19)

This invention relates to pebble heater apparatus. In one of its more specific aspects, it relates to improved pebble heater and reaction chambers of pebble heater apparatus. In another of its more specific aspects, it relates to a method of regulating gas and pebble flow through pebble heater apparatus. In another of its more specific aspects, it relates to a method of obtaining more nearly equal pebble gas contact time through pebble heater and reaction chambers.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first or upper chamber. That material forms a moving or fluid bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials therein.

Conventional pebble heater chambers of pebble heater apparatus are generally formed as cylinders and a solid heat exchange material is passed thereinto in the form of a moving bed. Hot heat exchange gases are sometimes introduced into the upper cylindrical bed at the lower end and at the periphery of such a chamber and are sometimes introduced through a perforate refractory arch which supports the moving pebble bed. The solid heat exchange material is withdrawn from a substantially central point in the bottom of the bed and is passed downwardly into a gas heating chamber where a second moving bed of solid heat exchange material is formed. One disadvantage of a conventional pebble chamber in which a relatively shallow pebble bed is maintained and which has a single pebble outlet in its lower end, is that it is most difficult to establish uniform flow of uniformly heated solid heat exchange material through the pebble chamber. In chambers in which the withdrawal of solid heat exchange material is made from a substantially central point in the bottom of the pebble chamber, the center of the pebble bed tends to drop out when the depth of the pebble bed reaches a dimension in the neighborhood of one and one-half times the diameter of the cylinder served by the single pebble outlet. Another disadvantage of the conventional pebble heater apparatus is that gas which is injected into the pebble chambers is not evenly distributed through the pebble bed, thus failing to accomplish the most efficient heat exchange.

Solid heat exchange material, which is conventionally used in pebble heater apparatus, is generally called "pebbles." The term "pebbles" as used herein, denotes any solid refractory material of flowable size and form, having strength enough to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-fourth and three-eighths inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other material having the properties above described may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic when used in any selected processes.

An object of the invention is to provide improved means for thermally treating or reacting gaseous materials. Another object is to provide improved means for controlling pebble flow through pebble heater apparatus. Another object is to provide an improved method of controlling pebble flow through pebble heater apparatus. Another object is to provide improved means for more evenly effecting distribution of gaseous materials through pebble chambers in pebble heater apparatus. Another object is to provide an improved method for distributing gaseous materials through pebble chambers of pebble heater apparatus. Other and further objects and advantages will be apparent upon study of the accompanying discussion, the drawings and the claims.

Figure 2:
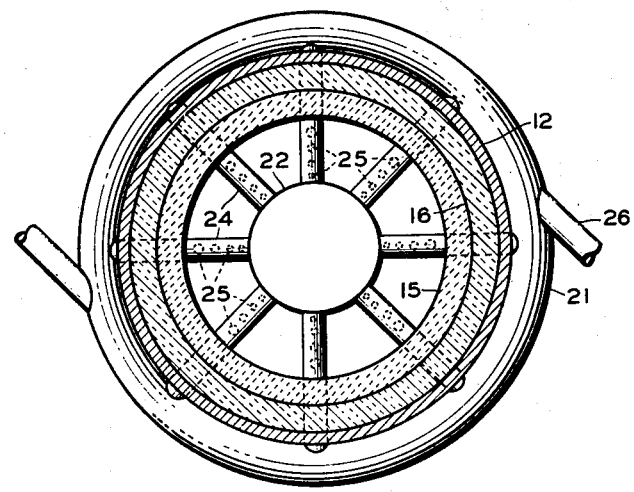
Figure 3:
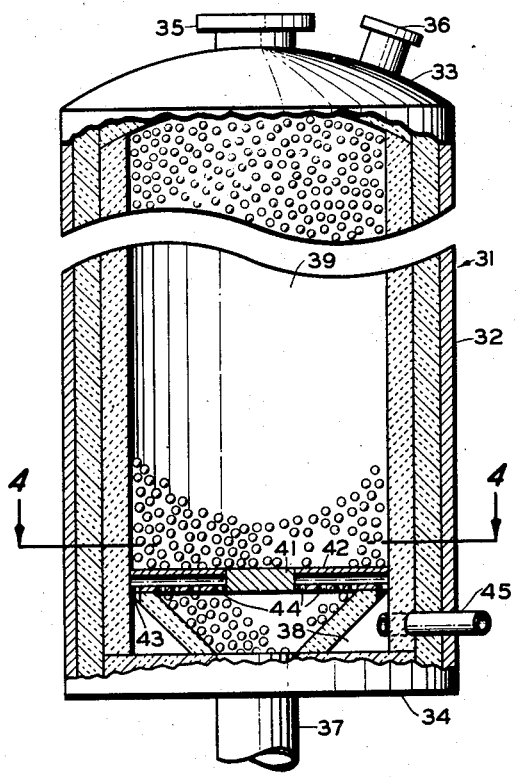
Figure 4:
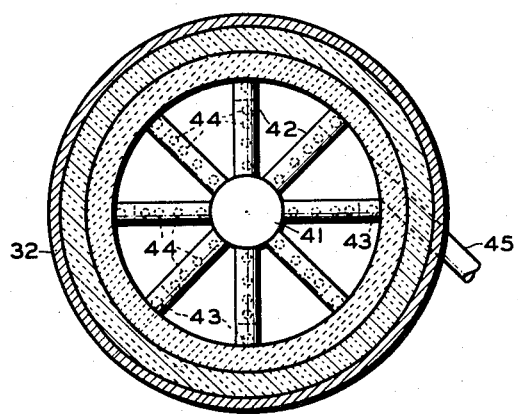
Figure 6:
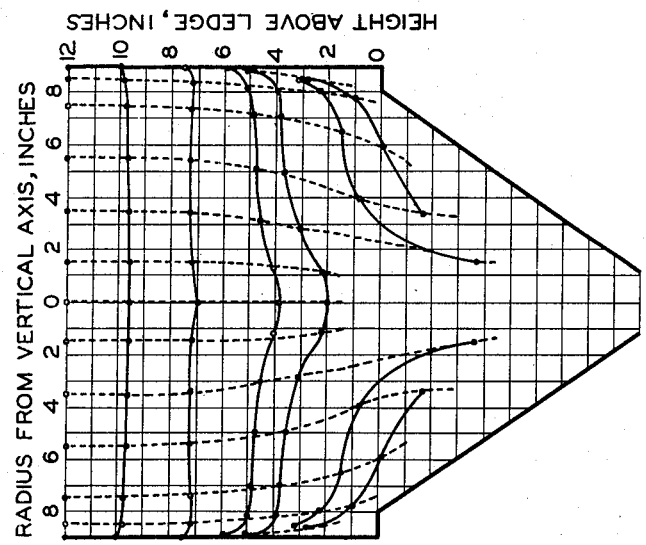
Figure 5:
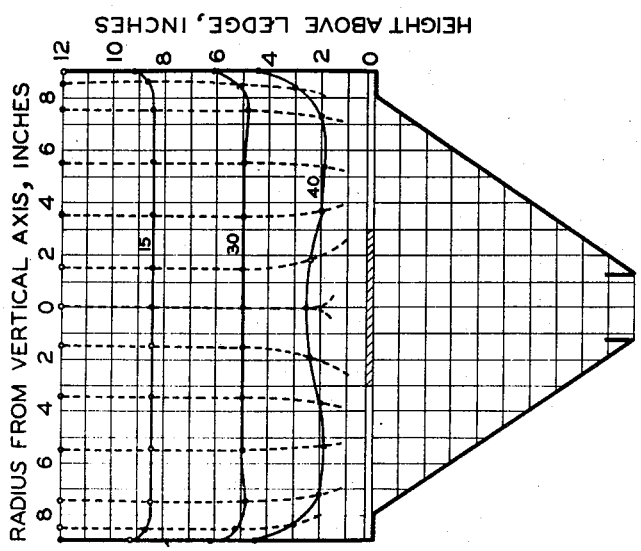

Understanding of the invention will be facilitated upon reference to the diagrammatic drawings in which Figure 1 is a vertical partial section of a pebble chamber embodying the invention. Figure 2 is a horizontal section taken along the 2—2 line of Figure 1. Figure 3 is a vertical partial section of a pebble chamber embodying a modification of the invention. Figure 4 is a horizontal section taken along the 4—4 line of Figure 3. Figure 5 is a graph showing pebble flow patterns in a pebble chamber equipped with the pebble baffle and gas distribution assembly of this invention. Figure 6 is a graph showing pebble flow patterns in a pebble chamber not provided with the pebble baffle and gas distribution assembly of this invention.

In Figure 1, pebble chamber 11 comprises a substantially vertically disposed shell 12 which is closed at its upper and lower ends by closure members 13 and 14, respectively. The walls of shell 12 are lined with insulating means, which insulating means may include common refractory material and super-refractory material as well as other insulation material. The exact material utilized in the formation of the shell lining will depend upon the temperatures to which the interior of the chamber will be subjected. When the pebble chamber is utilized as a pebble heating chamber super-refractory materials 15 backed by other insulation materials 16 are preferred because high temperatures, i. e., ranging as high as from 3000 to 3300° F. are experienced therein. When the chamber is utilized as a gas heating chamber of a pebble heater apparatus, insulation materials having somewhat lower heat resistance may be utilized. Common refractory materials which may be utilized may include block insulation, insulating fire brick, fire clay fire brick and insulation cement. Super-refractory materials may include silicon carbide, mullite, alumina, or other suitable refractory materials having physical and chemical properties which provide sufficient strength to withstand reasonably heavy external pressure and high temperature without substantial breakage or deterioration.

Shell 12 is provided with a pebble inlet 17 which is preferably substantially centrally disposed in the upper end of the shell. It is also provided with an effluent outlet conduit 18 in its upper portion. Pebble outlet conduit 19 is substantially centrally located in the lower end of shell 12. Closure member 14 is preferably shaped as an inverted cone so as to direct the flow of pebbles into pebble outlet conduit 19. Gas distribution chamber 21 is formed as a bustle ring adjacent the periphery of shell 12 at its lower end. Though gas distribution chamber 21 is shown as being made of metal, it may be formed of any refractory, super-refractory or insulating cement which will withstand the temperatures to which such a gas distribution chamber is necessarily subjected. Pebble baffle member 22 is provided within pebble chamber 23 and is disposed horizontally and substantially coaxially with pebble outlet conduit 19 and spaced therefrom so as to allow sufficient room for the passage of pebbles into outlet conduit 19. Pebble baffle member 22 is preferably supported by perforate gas conduit members 24 which extend substantially horizontally as radii of the axis of chamber 23 from baffle member 22 at their inner ends to communicate with gas distribution chamber 21 at their outer ends. Pebble baffle member 22 and gas conduits 24, like gas distribution chamber 21, may be formed of any suitable material which has sufficient strength to withstand the heavy loads placed upon them and which will withstand those temperatures to which the chamber is subjected. If low temperatures are utilized within the pebble chamber, metal alloys may be used to form the gas conduits and the pebble baffle member. If higher temperatures are utilized, the materials having greater heat resistance may be used. The outer diameter of pebble baffle member 22 is preferably larger than the inner diameter of pebble outlet conduit 19. It is preferred that the diameter of the pebble baffle member be between three-eighths and five-eighths of the diameter of the pebble chamber. It is also preferred that the horizontal cross-sectional area of the central baffle member be not greater than one-half the horizontal cross-sectional area of the pebble chamber. Perforate gas conduits 24 extend from baffle member 22 as spokes from a wheel. Perforations 25 are provided in gas conduit members 24, preferably in their lower portions, so as to allow the escape of gaseous material therethrough into pebble chamber 23. Perforations 25 have progressively greater cross-sections as the distance from the axis of the chamber increases. The total cross-sections of all perforations in any given annulus spaced from the baffle member toward the circumference of the pebble chamber is therefore greater as the distance from the axis of the pebble chamber increases, the annuli being of substantially equal thickness. Gaseous material inlet conduit means 26 is provided so as to communicate between the gaseous material supply source and gas distribution chamber 21. Conduit 26 is shown as being tangentially directed into chamber 21 but may be disposed at any angle. It is contemplated that conduit 26 may be either in the form of burners or may be only a common tubular conduit.

Pebble baffle member 22 may be either in the form of a flat plate as shown in Figure 1 or may be in the form of a cone. A cone construction is preferred, however, inasmuch as pebble flow is considerably benefited thereby. The slope of the surface of the cone is preferred to be between 35° and 75°. Such a slope will substantially eliminate formation of stagnant pebble zones upon the pebble baffles. The baffle is preferably spaced above pebble outlet conduit 19 a sufficient distance to be above the angle of slip of the pebbles taken at the inlet of conduit 19. The angle of slip varies between about 30° and 70°.

In the operation of the device shown in Figure 1, pebbles are inserted into the chamber 11 through pebble inlet conduit 17, forming a contiguous moving bed within chamber 11 and move downwardly therethrough and are removed through pebble outlet conduit 19. As the pebble bed moves downwardly through the pebble chamber, it is caused to flow outwardly over the circumference of baffle member 22 and between gas distribution conduits 25, thereby considerably retarding the flow of pebbles in the central portion of the chamber so as to maintain the rate of flow in the central portion of the pebble chamber more nearly equal to that of the flow of pebbles in the outer portions of the pebble chamber. Gaseous material is injected through conduit 26 into gas distribution chamber 21 and through perforate gas distribution conduits 24 downwardly through performations 25 and upwardly through pebble chamber 23 to the top of the pebble chamber from which effluent materials are removed through effluent outlet conduit 18. If chamber 11 is utilized as a pebble heating chamber, the gaseous fuel and oxygen-containing material from conduit 26 may be burned in chamber 21. If chamber 11 is utilized as a gas conversion or heating chamber, the gaseous material passing through conduit 26 remains unignited. In either event, the gaseous material is caused to flow upwardly through the pebble chamber in substantially equal volumes for all substantially equal cross-sectional areas of the pebble chamber.

In the device shown in Figure 3 of the drawings, pebble chamber 31 comprises a closed outer shell 32 which is closed at its upper and lower ends by closure members 33 and 34, respectively. Pebble inlet conduit 35 and effluent outlet conduit 36 are provided in the upper portion of shell 32, preferably in closure 33. Pebble outlet conduit 37 is disposed substantially coaxially in the lower end of shell 32. Gas distribution chamber 38 is formed in the lower end of pebble chamber 39 and is separated from pebble containing chamber 39 by a refractory wall. The baffle member 41 and gas distribution conduits 42 are similar to baffle member 22 and gas distribution conduits 24, respectively, shown in Figure 1 of the drawing. Baffle member 41 is preferably supported by gas distribution conduits 42 which communicate between gas distribution chamber 38 and pebble chamber 39 through apertures 43 and 44, respectively, preferably in the lower portion of gas distribution conduits 42. Apertures 44 are preferably of equal cross-sectional area and are spaced apart longitudinally in the gas distribution conduit inversely to the square of the distance of each aperture from the axis of the pebble bed. The outer ends of gas distribution conduits 42 terminate in the insulation lining of shell 32 and communicate with gas distribution chamber 38 through apertures 43 adjacent their outer ends. Gaseous material inlet conduit 45 is provided so as to communicate between a gaseous material supply source and gas distribution chamber 38. Conduit 45 may be either in the form of burners or may be only common tubular conduits. The materials utilized as lining for shell 32 and for forming gas distribution chamber 38 as well as those materials utilized to form baffle member 41 and gas distribution conduits 42 will depend upon the temperature to which the interior of the pebble chamber will be subjected. Gaseous material inlet conduit 45, as shown in Figure 3, extends tangentially into gas distribution chamber 38. It is contemplated, however, that the gaseous inlet means may be disposed at any angle and so arranged as to direct gas through the side or bottom portion of chamber 38.

The operation of the device shown in Figure 3 of the drawing is similar to that shown in Figure 1. Pebbles are inserted into pebble chamber 39 through pebble inlet conduit 35. The inserted pebbles form a contiguous moving bed within chamber 39 and flow downwardly therethrough and out through pebble outlet conduit 37. Baffle member 41 and gas distribution conduits 42 retard the flow of pebbles in the central portion of pebble chamber 39 so as to make the rate of pebble flow through the central portion of the pebble chamber more nearly equal the rate of flow of pebbles in the outer portions of pebble chamber. Gaseous material is injected into chamber 38 through gaseous material inlet conduit 45 and flows upwardly into conduits 42 through apertures 44 and is injected through apertures 44 into the pebble chamber. The volume of gaseous material injected into every substantially equal unit cross-sectional area of the pebble bed is substantially equal. The gaseous material flows upwardly through the pebble bed into chamber 39 to the upper portion of the chamber and are removed therefrom through effluent outlet conduit 36. Pebbles are removed from the bottom of the pebble chamber through pebble outlet conduit 37.

Figure 7:
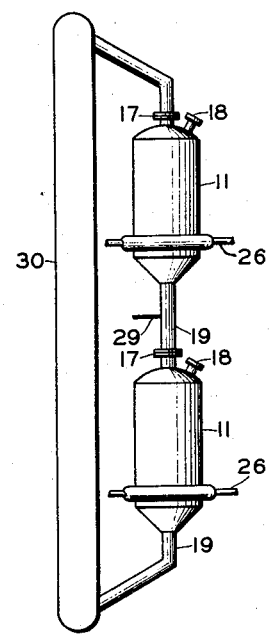

Chamber 11 or chamber 31 may be utilized to form both of the pebble chambers shown in the device of Figure 7 of the drawings. In the device shown in Figure 7, pebbles are inserted by means of upper pebble inlet conduit 17 into chamber 11 and flow downwardly as a contiguous mass through the upper and lower chambers 11 from which the pebbles are removed through pebble outlet conduit 19 and are recycled to the top of upper chamber 11 by elevator means 30. Gaseous fuel material is injected into the upper chamber 11 through gaseous material inlet conduit 26 and is burned in distribution chamber 21 so as to form hot combustion gas which flows upwardly countercurrently to and in direct heat exchange relation with the downwardly flowing bed of pebbles in upper chamber 11. Combustion gases are removed through upper effluent outlet conduit 18. A second gaseous material is injected into the lower chamber 11 through gaseous material inlet conduit 26 and is caused to flow countercurrently in direct heat exchange relation with the hot pebble mass flowing as a contiguous mass from upper chamber 11 downwardly through lower chamber 11. Effluent material is removed through effluent outlet conduit 18 in the lower chamber and inert gas, such as steam, may be injected into conduit 19 through conduit 29 so as to prevent the passage of combustion gas into the lower chamber and effluent material from the lower chamber into the upper chamber. The cooled pebbles which are removed from outlet conduit 19 of the lower chamber are recycled as above stated to pebble inlet conduit 17 in the upper pebble chamber by elevator means 30.

The size of the pebbles is a determining factor in the size of pebble outlets of pebble heater apparatus. Best pebble flow is secured through outlets which have diameters at least seven or eight times the diameter of the pebble. When circulating pebbles through the pebble chambers disclosed in Figures 1 and 3 of the drawings, it is preferred that the width of the opening between the baffle members and the side of the conical shaped portion of the pebble chamber be at least seven or eight times the diameter of the pebbles utilized within the chamber. It is preferred that the pebble chamber have a substantially conically shaped bottom so as to substantially eliminate stagnant areas in the pebble bed. It is also preferred that the slope of the cone shaped bottom of the chamber be between about 35° and 75°. Flowing pebbles tend to funnel toward a central outlet. If the bottom of the pebble chamber is not cone shaped, it will be necessary to support the baffle members within the chamber at a sufficient height above the pebble outlet so that sufficient space is provided at the periphery of the baffle to allow pebbles to flow between the baffle and the stagnant pebble bed area. One modification which may be utilized to raise the baffle member the desired distance above the pebble outlet is to slope the gas distribution conduits upwardly so that they are substantially parallel to the top surface of the pebble bed.

Specific advantages to be derived by the utilization of the instant invention will be even more obvious upon reference to the graphs shown as Figures 5 and 6 of the drawings. A model pebble chamber having a diameter of eighteen inches and having a conical shaped bottom, the slope of which was approximately 55° from the horizontal, was filled with pebbles to a depth of twelve inches. Given volumes of pebbles were removed through a two and one-half inch outlet in the bottom of the chamber and an equal amount of pebbles was simultaneously added to the top of the chamber. Colored pebbles were initially positioned in the top layer of the pebble bed. After a given volume of the pebbles was removed from the pebble chamber, the pebbles which had been added were removed so as to measure the positions of the colored pebbles in the pebble bed. The graphs show the initial position of the colored pebbles before withdrawal and after withdrawal of the given volumes of pebbles, the cumulative volumes being indicated by the numbers on the isochores which connect the positions plotted for colored pebbles after each withdrawal step. Broken arrow lines indicate the direction of flow of the colored pebbles.

As will be seen in the graph shown in Figure 5, substantially more even flow of pebbles is maintained to a point approximately two inches above the inlet to the conical bottom closure than was obtained in the chamber without the baffle and gas distribution means, the results of which are shown in the graph of Figure 6. The above two examples are presented as illustrations only. The sizes and proportions of the chambers and baffle are presented as being typical and should not be construed to limit the invention unduly.

As will be evident to those skilled in the art, various modifications of this invention can be made or followed in the light of the foregoing disclosure, discussion and examples without departing from the spirit or scope of the disclosure or from the scope of the claims.

We claim:

1. In pebble heater apparatus utilizing a moving bed of heated pebbles, an improved pebble chamber comprising a substantially vertically disposed closed outer shell; liner means within and adapted so as to insulate said shell and form a pebble chamber therein; pebble inlet means in the upper end of said shell; a gas distribution chamber adjacent the lower portion of said pebble chamber; gaseous material inlet means communicating between a gaseous material supply source and said gaseous material distribution chamber; a central pebble flow control baffle member in the lower portion of said chamber; a gaseous material distributor assembly comprising a plurality of perforate gas conduits extending from said central baffle member as radii of said shell to the outer portion of said pebble chamber, said conduits communicating at their outer ends with said gaseous material distribution chamber; pebble outlet conduit means in the lower end of said shell; and effluent outlet means in the upper portion of said shell.

2. In pebble heater apparatus utilizing a moving bed of heated pebbles, an improved pebble chamber comprising a substantially vertically disposed closed outer shell; liner means within and adapted so as to insulate said shell and form a pebble chamber therein; pebble inlet means in the upper end of said shell; a gas distribution chamber adjacent the lower portion of said pebble chamber; gaseous material inlet means communicating between a gaseous material supply source and said gaseous material distribution chamber; a central pebble flow control baffle member in the lower portion of said chamber; a gaseous material distributor assembly comprising a plurality of perforate gas conduits extending from said central baffle member as radii of said shell to the outer portion of said pebble chamber, said conduits communicating at their outer ends with said gaseous material distribution chamber and the total cross-section of said perforations therein being progressively greater for annuli of said pebble chamber progressively removed from said baffle member toward the circumference of said pebble chamber, the annuli being of substantially equal thickness; pebble outlet conduit means in the lower end of said shell; and effluent outlet means in the upper portion of said shell.

3. The pebble chamber of claim 2, wherein equal sized perforations are spaced apart in said gas conduits inversely to the square of their distance from the axis of said chamber.

4. The pebble chamber of claim 2, wherein said perforations equally spaced along said conduits have progressively greater cross-sections in proportion to their distance from the axis of said chamber.

5. The pebble chamber of claim 2, wherein the diameter of said central baffle member is between ⅜ and ⅝ of the diameter of said chamber.

6. The pebble chamber of claim 2, wherein the horizontal cross-sectional area of said central baffle member equals up to one-half of the cross-sectional area of said chamber.

7. In pebble heater apparatus utilizing a moving bed of heated pebbles, an improved pebble chamber comprising a substantially vertically disposed closed outer shell having an inverted conical shaped bottom closure; liner means within and adapted so as to insulate said shell and form a pebble chamber therein; pebble inlet means in the upper end of said shell; a gaseous material distribution chamber adjacent said pebble chamber; gaseous material inlet means communicating between a gaseous material supply source and said gaseous material distribution chamber; a central pebble flow control baffle member in the lower portion of said chamber; a gaseous material distributor assembly comprising a plurality of perforate gas conduits extending horizontally from said central baffle member as radii of said shell to the outer portion of said pebble chamber, said central baffle member being horizontally positioned in a plane adjacent said conical bottom and said perforate conduits communicating at their outer ends with said gaseous material distribution chamber, the total cross-section of said perforations being progressively greater for annuli of said pebble chamber progressively removed from said baffle member toward the circumference of said pebble chamber, the annuli being of substantially equal thickness, pebble outlet conduit means in the lower end of said conical bottom closure; and effluent outlet means in the upper portion of said shell.

8. The pebble chamber of claim 7, wherein equal sized perforations are spaced apart in said gas conduits inversely to the square of their distance from the axis of said chamber.

9. The pebble chamber of claim 7, wherein said perforations equally spaced along said conduits have progressively greater cross-sections in proportion to their distance from the axis of said chamber.

10. The pebble chamber of claim 7, wherein the diameter of said central baffle member is between ⅜ and ⅝ of the diameter of said chamber.

ROBERT R. GOINS.
DICK S. HALL.

REFERENCES CITED

The following references are of record in the file of this patent:

UNITED STATES PATENTS

| Number | Name | Date |
| --- | --- | --- |
| 1,453,750 | Christensen | May 1, 1923 |
| 2,445,092 | Utterback | July 13, 1948 |

FOREIGN PATENTS

| Number | Country | Date |
| --- | --- | --- |
| 443,745 | France | July 22, 1912 |